(12) United States Patent
Collins, Jr.

(10) Patent No.: US 11,701,553 B1
(45) Date of Patent: Jul. 18, 2023

(54) HEIGHT ADJUSTABLE BOWLING BALL STAND

(71) Applicant: Aaron Collins, Jr., Houston, TX (US)

(72) Inventor: Aaron Collins, Jr., Houston, TX (US)

(*) Notice: Subject to any disclaimer, the term of this patent is extended or adjusted under 35 U.S.C. 154(b) by 0 days.

(21) Appl. No.: 17/572,259

(22) Filed: Jan. 10, 2022

(51) Int. Cl.
  *A63B 47/00* (2006.01)
  *F16M 11/28* (2006.01)

(52) U.S. Cl.
  CPC ........... *A63B 47/007* (2013.01); *F16M 11/28* (2013.01); *A63B 2210/50* (2013.01); *A63B 2225/093* (2013.01); *A63B 2225/74* (2020.08)

(58) Field of Classification Search
  CPC ... A63B 47/007; A63B 2225/75; A63B 10/50; A63B 2210/58; A63B 2225/093; F16M 11/28
  USPC .......................................... 206/315.9–315.91
  See application file for complete search history.

(56) References Cited

U.S. PATENT DOCUMENTS

| 4,140,893 | A  | * | 2/1979  | Renteria .............. A63B 47/005 219/535 |
| 9,737,654 | B2 | * | 8/2017  | Walther ................. F16M 11/42 |
| 2012/0119045 | A1 | * | 5/2012  | Gaal ..................... F16B 7/0433 248/219.4 |
| 2013/0168526 | A1 | * | 7/2013  | Walther .............. A61M 5/1415 248/519 |
| 2015/0335774 | A1 | * | 11/2015 | Gomez .................. F16M 11/08 250/454.11 |
| 2016/0205912 | A1 | * | 7/2016  | Hartsock ............ A01K 89/0178 |
| 2018/0051851 | A1 | * | 2/2018  | Hobbs .................. F16M 13/022 |
| 2022/0071392 | A1 | * | 3/2022  | Hanks ...................... A45C 3/02 |

* cited by examiner

*Primary Examiner* — Christopher Garft

(57) ABSTRACT

An extendible and collapsible stand holds and stores a bowling ball for a bowler during bowling activities. This stand can have a tapered shape from a base up to a seat on which the bowling ball sits. Multiple extension segments can be slidably connected together in this tapered shape and can individually extend and lock to vary or adjust the height of the stand. The seat forming the top of the stand has a concave shape to provide a compatible surface for which the ball will rest. The seat can also have a lighting means for shining light downward onto the stand base and surface supporting the stand. When not in use, the stand height can collapse down for efficient carry by the user.

7 Claims, 5 Drawing Sheets

HEIGHT ADJUSTABLE BOWLING BALL STAND

FIELD OF THE INVENTION

This invention relates to a stand on which one places a bowling ball for storage purposes during a bowling activity. In particular, this relates to a portable bowling ball for storing a bowling ball during a bowling activity. More particularly, this invention relates to an extendable and collapsible height adjustable bowling ball stand for storing a bowling ball during bowling games.

BACKGROUND

Bowling is a professional sport and recreational activity in which a player rolls or bowls a ball toward pins (in pin bowling) positioned at the end of a long path. Bowling is a popular pastime, and many people bowl as a profession. The goal is to knock down as many pins as possible with each bowling attempt. The person who knocks down the most pins in the bowling scoring system will win the bowling match.

The setup for a bowling activity is to create a lane. The lane has a long straight path, typically 42 inches wide and 60 feet long. One measures this lane length from the foul line to the head bowling pin. The primary surface of the bowling lane is wood. At one end of the lane are a set of bowling pins. These pins are typically arranged in a triangular shape. Four pins comprise the base of the triangle. Three pins form the next line of pins. The next row has two pins. One (the headpin) pin forms the point of the pin configuration and is the pin closest to the bowler. This configuration comprises ten pins positioned in four rows forming the triangle shape. On each side of the bowling lane is a trough known as a bowling gutter. These gutters run parallel to the lane for the length of the lane. The purpose of the bowling gutter is to catch the bowling ball if it rolls off the lane as it travels toward the bowling pins. If the ball runs off the lane before reaching the bowling pins, it will run into one of the gutters and not reach balls. Avoiding the gutters is part of the skill perfected during howling.

Bowling is popular among individuals and groups. Teams of bowlers form leagues that meet to compete regularly. Tournaments having several teams bring out bowlers to compete and people to watch. These bowling activities occur in bowling alleys. These facilities can have a more significant number of bowling lanes to enable many people to bowl at one time. Some bowling alleys can have 30 to 50 bowling lanes. Bowling alleys contain an enormous amount of equipment to facilitate bowling operations. in addition to the howling lanes, mechanical equipment used in a bowling alley includes the bowl return system, game, and scorekeeping systems. Multiple bowling lanes enable many people to bowl simultaneously in a conventional layout of the bowling area in a bowling alley. Scorekeeping consoles allow the players to manage games for one or more lanes. Seats enable the scorekeeper to operate the console and manage bowling activities. In the same area as the scorekeeping console is a seating area for bowlers participating in the game. These seating areas can have score consoles through the bowling alley for the various lanes. In front of the scorekeeping, a console is a bowling return and ball rack system, which returns the ball after one bowls a turn. This system can also store the ball while a bowler waits for their next turn. When a bowler begins their turn to bowl, they start in the run-up area. A foul line marks the point that a bowler must release the bowl. If the bowler crosses that line before releasing the bowl, that turn will be a foul. Connected to the scorekeeping console is a bowling score display. This display shows the current score for each bowler during a game.

FIG. 1 shows a current layout of an area for bowlers in a bowling alley. Because of contagious viruses and a consequence of the COVID 19 pandemic, some bowling alleys have reconfigured their layouts. As shown, this layout contrasts with the conventional design regarding the area where the bowlers are during a game. For example, in FIG. 1, there are no seats or seating area next to the scorekeeping console 104 or ball return and ball rack system 110. A walking space 118 provides a particular area between the bowling area of the scorekeeping console 104, ball return and rack system 110, bowler run-up area 112, and bowler seating area 120. This bowling area can contain tables 122 and chairs 124. This seating area 220 is also the place where people eat and socialize. Developments such as the COVID-19 epidemic have caused people and businesses to rethink how close in proximity people are during activities. Another effect is the desire not to return one's bowling ball, and it remain in the rack 110. A bowler would now retrieve their ball and keep it with them until their turn. This approach prevents bowling balls from various users from being stored together and having contact with each other. In this current bowling alley layout, the seating area 120 is a substantial distance from the bowling area and bowling run-up area 112. If a bowler wants to keep their ball at the seating area, there needs to be some means to do so. There remains a need for some means for a bowler to conveniently store a ball at their seating area as they wait their turn to bowl.

SUMMARY

An extendible and collapsible stand holds and stores a bowling ball for a bowler during bowling activities. This stand can have a tapered shape from a base up to a seat on which the bowling ball sits. The seat forming the top of the stand has a concave shape to provide a compatible surface for which the ball will rest. The seat can also have lighting means for shining light downward onto the stand base and surface supporting the stand. Multiple extension segments can be slidably connected and individually extended and locked to vary or adjust the height of the stand. A power source such as a battery supplies power to the lightning means to illuminate the area below the stand seat and the area around the stand. A handle attached to the stand provides an easy way to transport the stand. When not in use, the stand height can collapse down for efficient carry by the user.

DETAILED DESCRIPTION OF THE INVENTION

The presently-described height-adjustable howling ball stand provides a howler with a convenient way to store their ball during a bowling activity. This stand gives the bowler a space for their ball without having the ball positioned in an area with balls from other players during a game. As mentioned, for various reasons, a bowler may prefer to keep the ball separate from other balls that rest on the ball return and rack console. The portable stand of this invention gives a bowler the flexibility to conveniently store their ball in a place they prefer during the bowling activity.

Figure 1:
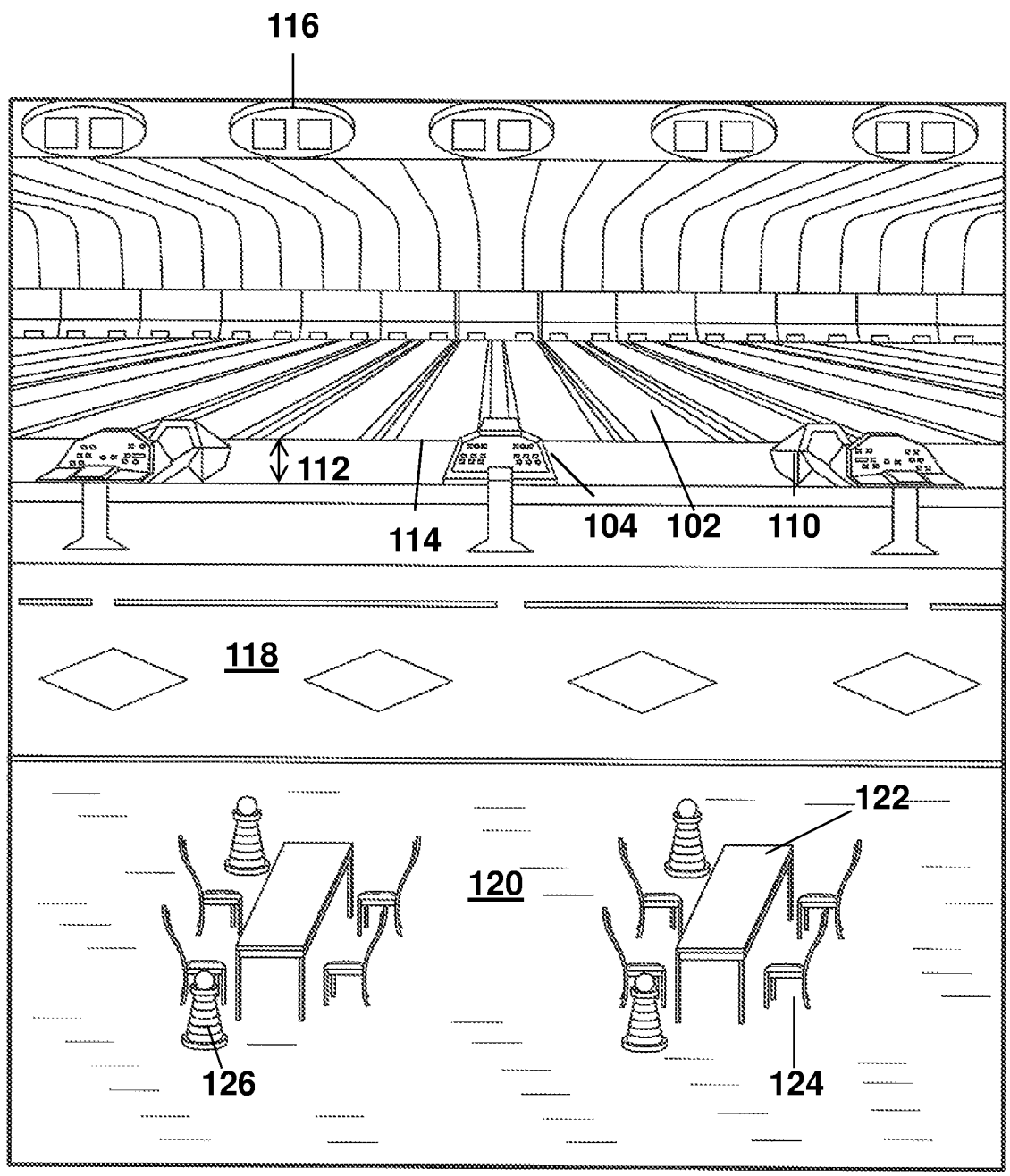
FIG. 1 is a view of a modern bowling alley layout with separated the bowling area and bowler's area.
Figure 2:
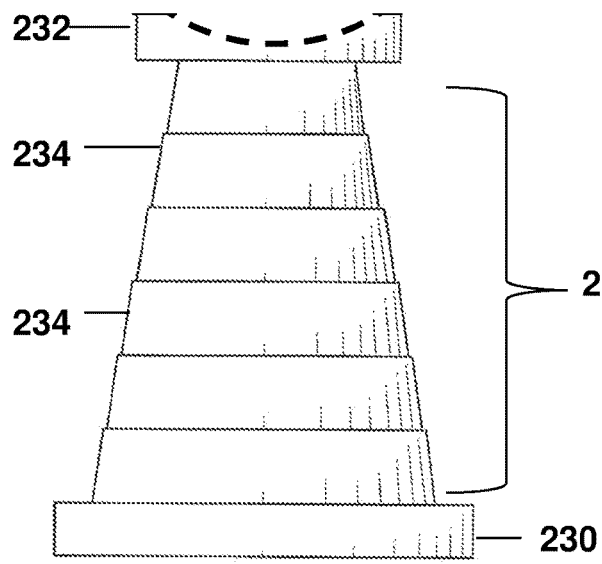
FIG. 2 is a view of a bowling ball stand of the present invention in the height extended position.

FIG. 2 shows a side view of the bowling ball stand in an extended position. This view shows a stand extended to its full height. This bowling ball stand has a base 230. This base forms the bottom of the stand and will rest on the surface where the owner places the stand. The base 230 can have a circular cylindrical shape gives it a top surface, side surface, and flat bottom surface. Connected to the top surface of the base 230 is a core section 231. This section can have a lower end connected to the base and a tapered shape leading to an upper end of this core. Two or more individual segments 234 are connected to enable these segments to slide up or down as needed to adjust the height of the stand. When the user changes the stand so that the stand height increases, one can slide these segments upward and lock them to hold them in place. This slide and lock process can be performed through currently known methods. Each core segment has an outer side and an inner side, and an upper edge and a lower edge. These core segments enable the core section 231 to have a hollow center. Attached to the top of the core section is ball seat 232. This seat is where the bowler will place the ball on the stand. The seat has a top surface with a concave (semi-circular) shape. The curvature of the top surface closely matches the curvature of bowling balls. Matching the curvature of the ball seat with the curvature of bowling balls provides a better fit and more stability when one places a bowling ball on the seat. Having a howling ball and ball seat with curvatures that are not closely matched can result in ball movement when placed on the ball seat of the stand. Matching bowling ball and ball curvatures can be done by determining the range of bowling ball sizes and corresponding ball diameters, calculating an average bowling ball diameter, and creating a ball seat curvature having the same diameter as the average of the bowling balls. Once the ball is placed in the ball seat, there should be no gaps or space between the ball and seat surface.

Figure 3:
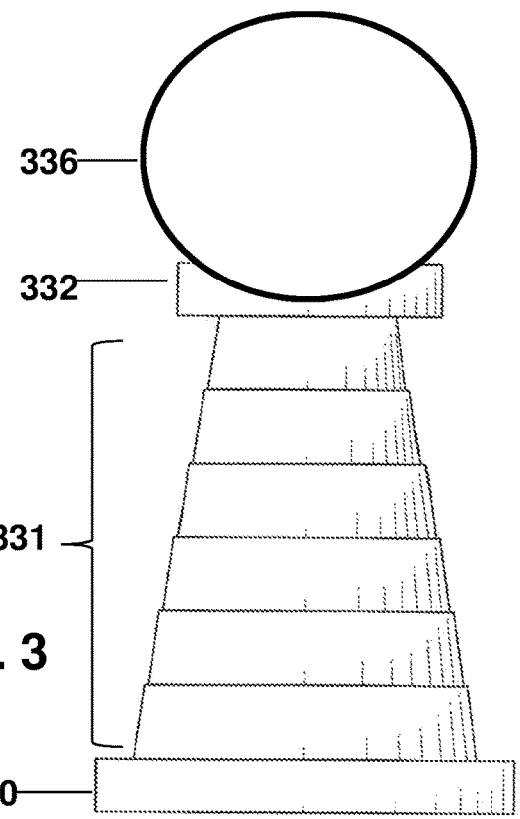
FIG. 3 is a view of a bowling ball stand of the present invention in the height extended position with a bowling ball placed in the stand seat.

FIG. 3 shows the bowling stand of the present invention with a bowling ball 336 placed in the ball seat 332. Again, the core section 331 is in the full height extended position. In this design, there is an important relationship between the size of the base 330 and the ball seat 332. As the height of the stand is extended, the center of gravity of the stand goes up. This center of gravity is where the total weight of the object is concentrated. Therefore, as the height of the stand increases and with the added weight of a bowling ball, the center of gravity is elevated. This elevated center of gravity can decrease the stand's stability and make it easier for the stand to tumble over. To counter this condition, the base 330 has a larger circumference than the circumference of the ball seat 332. In addition, the tapered shape of the core section 331 helps add stability and address this center of gravity issue.

Figure 4:
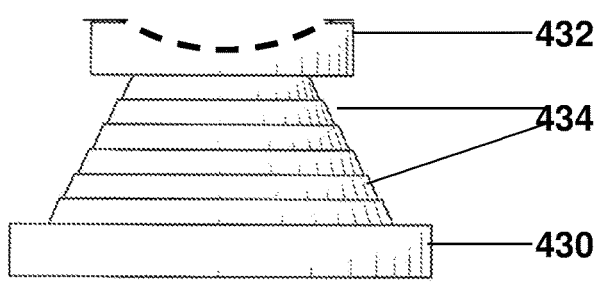
FIG. 4 is a view of the bowling ball stand of the present invention in the collapsed position.
Figure 4A:
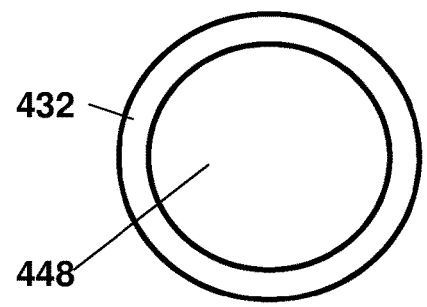
FIG. 4a is a top view of the ball seat of the present invention.

FIG. 4 shows the howling ball stand of the present in a collapsed position. As mentioned, the core segments 434 are slidably attached. This configuration enables the core section to slide in either upward or downward directions to extend and reduce the height of the stand as desired. With the tapered shape of the core section, each core segment's size (circumference) decreases in ascending order. For example, the segment attached to the base 430 would have the largest circumference. Each ascending segment would have smaller than the segment below it and a circumference larger than the segment above it. The segment attached to the ball seat 432 would have the smallest circumference size. When in the collapsed position, all segments can align internally and result in a minimal height of the first segment attached to the base. The collapsed position can facilitate easier transport, of the bowling ball stand when not in use. The size of the base can also be of a size that will enable a bowler to place the stand in a bowling ball bag and function as designed during a bowling activity. This feature can be for the convenience of the bowler. FIG. 4a shows a top view of the ball seat 432. This seat can have a continuous wall 432 and the concave seat 448.

Figure 5:
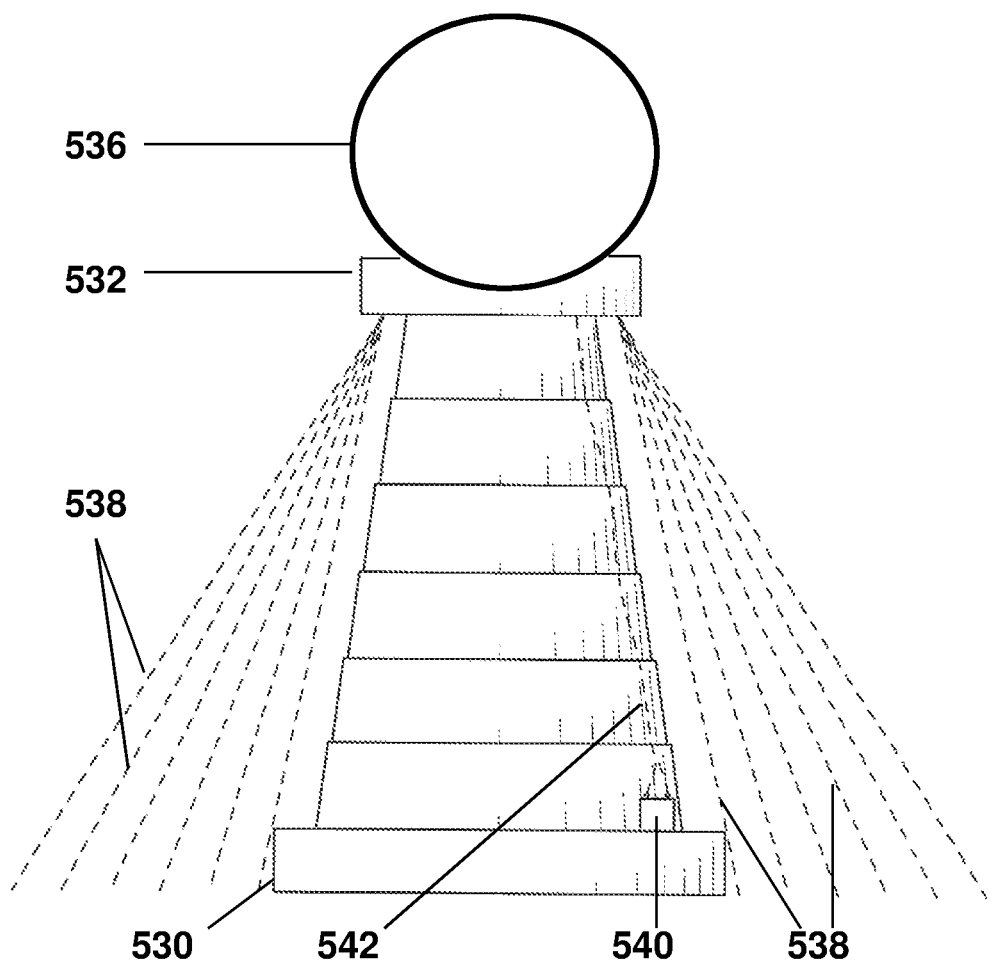
FIG. 5 is a view of the bowling ball stand of the present invention showing illuminating means and power source to supply power to the illuminating means.

In addition to holding a bowling ball, the stand of the present invention can provide light to illuminate the surface area around the stand. FIG. 5 shows the bowling ball stand of the present invention with lights that shine light in downward and outward directions. As shown, light 538 reflects from the ball seat 532 shines downward towards the stand base 530. A power source 540, such as a rechargeable battery, can supply power to the lighting means. A power cord 542 positioned inside the core section connects the power source to the lighting.

Figure 6:
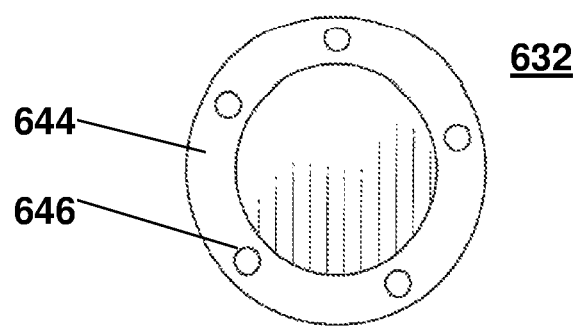
FIG. 6 is a bottom view of the seat of the bowling ball stand having showing positions for illuminating means.

FIG. 6 shows a view of the bottom surface 644 of the ball seat 632. This bottom surface can have receptacles 644 which light bulbs can shine to illuminate the area surrounding the bowling ball stand. In addition, a switch device attached to the bottom surface and connected to the power source can activate the lights as desired. This switch can also be located at or in the base and provide the same activation functions.

Figure 7A:
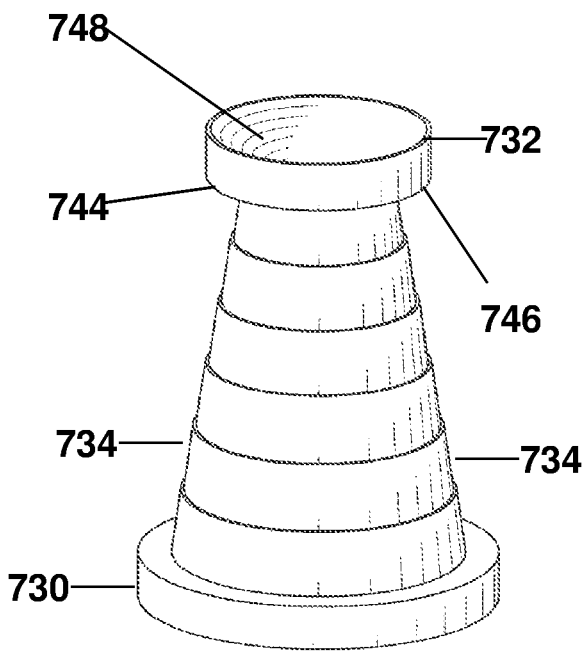
FIG. 7a is a front, side and top view of the bowling ball stand of the present invention in an extended position.
Figure 7B:
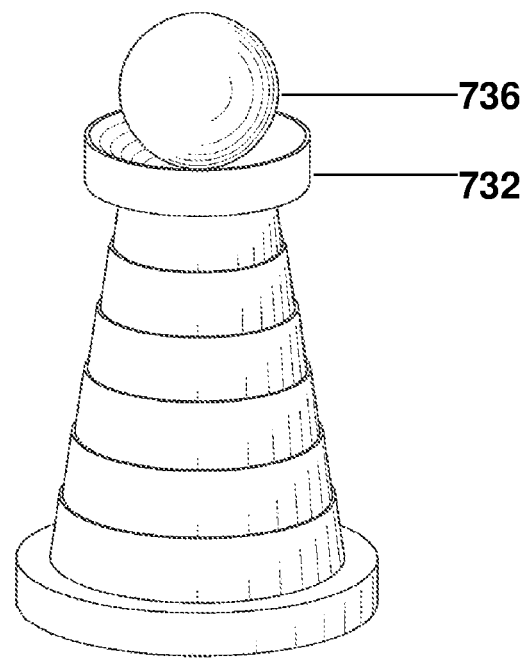
FIG. 7b is a front, side and top view of the bowling ball stand of the present invention in an extended position with a bowling ball resting in the stand seat.
Figure 7C:
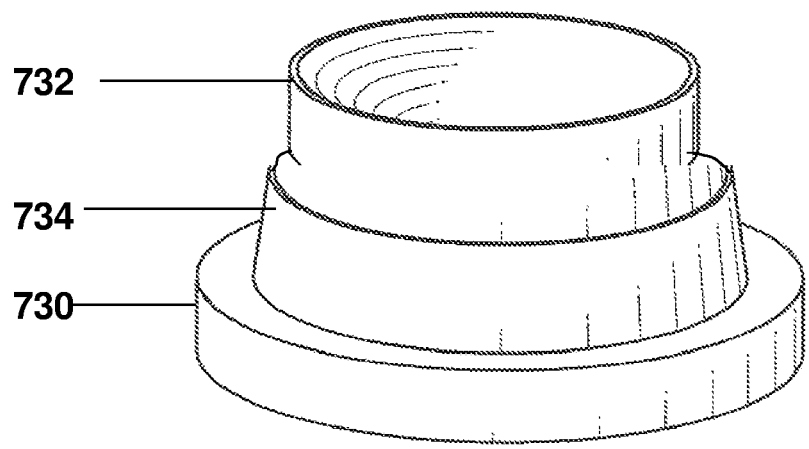
FIG. 7c is a front, side and top view of the bowling ball stand in a collapsed position.

FIGS. 7a, 7b, and 7c show more three-dimensional views of the bowling ball stand in the fully extended position. In FIG. 7a, seat 732 has a concave inner surface 748 with a curvature that will accommodate the shape of a bowling ball. The seat has a bottom surface 744, and lighting means 746. Also shown is the base 730, with a circumference larger than the circumference of the ball seat 732. The core segments 734 are configured in a tapered shape, with the segments decreasing in size relative to connected segments from the base 730 to the ball seat 732. FIG. 7b shows the three-dimensional view with a bowling ball 736 positioned in the ball seat 732.

Figure 8:
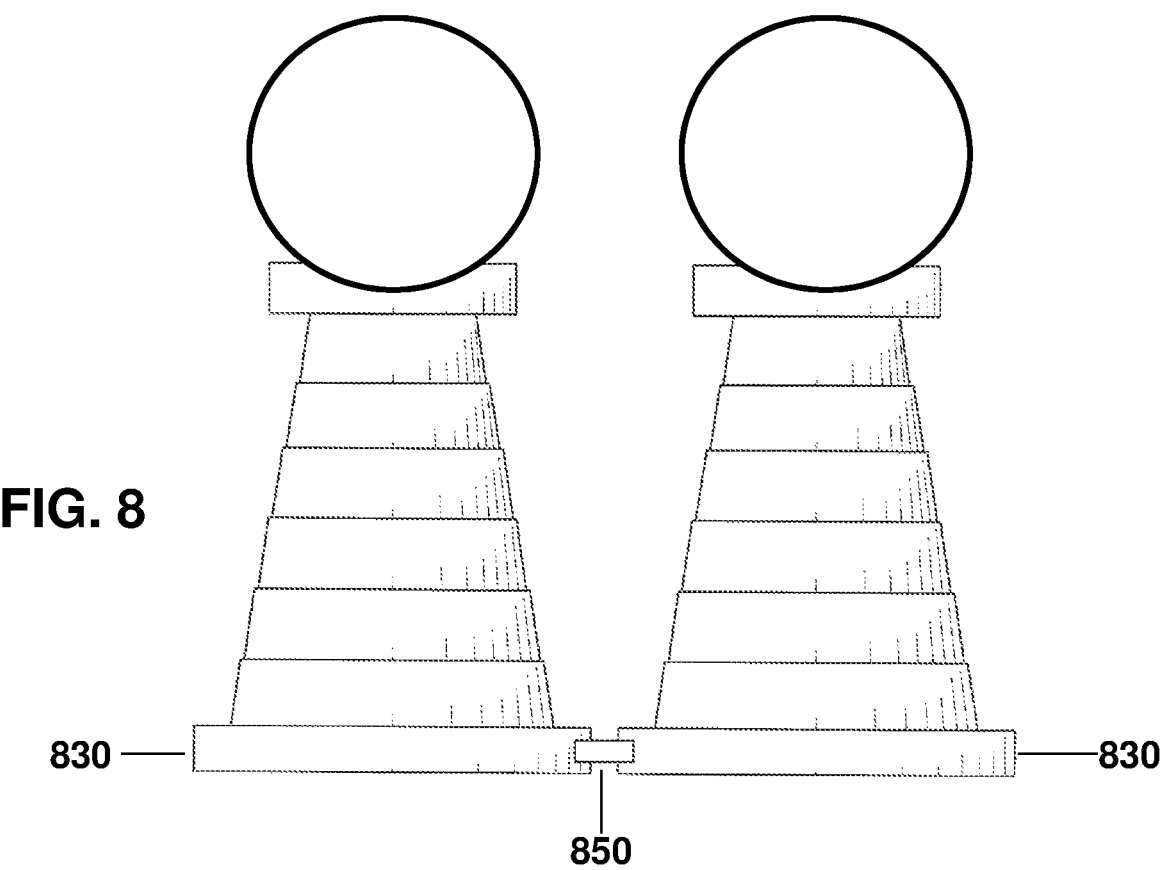
FIG. 8 is a view of twin bowling ball stands attached for holding multiple bowling balls.

FIG. 8 shows an alternate embodiment of the present invention in which there can be two or more bowling ball stands attached. Each base 830 can have openings that will allow for a clip or pin 850 will connect the stands and the base. Another feature of an alternate embodiment of the present invention can be a fan element attached to the stand.

The stand can be an external device connected to and powered by the same source as the lighting elements. A handle attached to the ball seat can conveniently transport the bowling ball stand. With the handle means connected to the stand, a user can conveniently transport the bowling ball stand regardless of the position of the strand. A lid element can fit over the concave surface of the ball seat when the stand is not in user.

While the present invention as been illustrated by the description of embodiments thereof, and while the embodiments have been described in some detail, it is not the intention of the applicant to restrict or in any way limit the scope of the invention to such details. Additional advantages and modifications will readily appear to those skilled in the art. The invention in its broader aspects is not limited to the specific details, representative apparatus and methods, and illustrative examples shown and described. Accordingly, departures may be made from such details without departing from the spirit or scope of the applicant's general inventive concept.

I hereby claim the following:

1. A height adjustable bowling ball stand for storing a bowling ball during a ling activity consisting of:
   a base having a top surface and a bottom surface, a continuous side enclosing an internal volume, said base providing stability for the stand;
   a core section formed of two or more slidibly attached core segments, said core segments having an outer side and inner side with said outer and inner sides forming an enclosure, said core segments being connected such that the each said core segment can slide in a linear direction and lock in place to adjust stand height and prevent movement of said core segments when the bowling ball weight is applied and said core segments being sequentially attached to each other with a base core segment being attached to the top surface of said base and a seat core segment attached to a ball seat;
   the ball seat connected to said ball seat core segments and opposite the base core segment, said ball seat having a concave top surface for positioning the bowling ball and a bottom surface attached to the ball seat core segment, said ball seat having a continuous side;
   lighting elements attached to said bottom surface of ball seat such that light is projected downward toward said base and an area surrounding said base;
   a power source connected to said lighting elements to provide power to operate said lighting elements;
   a handle attached to said stand for transport of said stand; and
   a fan element attachable to and detachable from said bowling ball stand for providing ventilation to an area surrounding said base; wherein said fan element is connected to a power source positioned in said base.

2. The height adjustable bowling ball stand of claim 1 wherein said core segments of said core section form a tapered shape when said core elements are extend in a direction away from said base wherein in said core section is broader at said base and narrow at said ball seat.

3. The height adjustable bowling ball stand of claim 2 wherein said base has a larger circumference than a circumference of said ball seat.

4. The height adjustable bowling ball stand of claim 1 wherein said power source is a battery positioned in said bowling ball stand on said base.

5. The height adjustable bowling ball stand of claim 1 wherein said handle is attached to said base.

6. The height adjustable bowling ball stand of claim 1 wherein said handle is attached to said ball seat.

7. A height adjustable bowling ball stand system for storing a bowling ball during a bowling activity consisting of:
   a first height adjustable bowling ball stand having:
      a base having a top surface and a bottom surface, a continuous side enclosing an internal volume, said base providing stability for the stand;
      a core section formed of two or more slidibly attached core segments, said core segments having an outer side and inner side with said outer and inner sides forming an enclosure, said core segments being connected such that the each of said core segments can slide in a linear direction and lock in place to adjust stand height and prevent movement of said core segments when bowling ball weight is applied and said core segments being sequentially attached to each other with a base core segment being attached to the top surface of said base and a seat core segment attached to a ball seat;
      the ball seat connected to said ball seat core segment and opposite the base core segment, said ball seat having a concave top surface for positioning a bowling ball and a bottom surface attached to the ball seat core segment, said ball seat having a continuous side;
      a power source to provide power to a lighting element; said lighting element configured to illuminate an area below and around said first height adjustable bowling ball stand;
   a second height adjustable bowling ball stand identical to said first height adjustable bowling ball stand; and
   a connector element to connect said first height adjustable bowling ball stand to said second height adjustable bowling ball stand.

* * * * *